United States Patent [19]

Wise et al.

[11] Patent Number: 4,643,474
[45] Date of Patent: Feb. 17, 1987

[54] CHILD'S CAR BOOSTER SEAT AND RESTRAINT SYSTEM

[75] Inventors: Robert D. Wise, Akron; Steven W. Justice, Columbus, both of Ohio

[73] Assignee: Gerber Products Company, Fremont, Mich.

[21] Appl. No.: 701,462

[22] Filed: Feb. 14, 1985

[51] Int. Cl.⁴ .............................................. A47D 1/10
[52] U.S. Cl. ..................................... 254/250; 297/488
[58] Field of Search ................ 292/488, 216, 250, 254

[56] References Cited

U.S. PATENT DOCUMENTS

| | | | |
|---|---|---|---|
| 296,975 | 4/1884 | Lampton | 297/488 |
| 3,409,326 | 11/1968 | Kerner | 297/488 X |
| 3,635,526 | 1/1972 | Posey | 297/488 |
| 3,865,433 | 2/1975 | Stafford | 297/488 |
| 3,945,678 | 3/1976 | Neuman | 297/488 X |
| 3,948,556 | 4/1976 | Hyde et al. | 297/488 X |
| 4,076,307 | 2/1978 | Nanba et al. | 297/488 X |
| 4,341,422 | 7/1982 | Cunningham . | |
| 4,456,302 | 6/1984 | Knoedler et al. | 297/488 |

FOREIGN PATENT DOCUMENTS 2404451 8/1975 Fed. Rep. of Germany ...... 297/488

Primary Examiner—Peter A. Aschenbrenner
Attorney, Agent, or Firm—Townsend and Townsend

[57] ABSTRACT

A child's car booster seat that cooperates with the automobile's existing safety belt restraint system is disclosed. A contoured seat bottom elevates the child above the existing automobile seat. A frontal shield is fixed pivotally and slidably along one side of the seat and removably fitted at the other side of the seat to lock into variable positions on the booster seat. A channel traversing the front of the shield accepts the automobile's lap safety belt for securing the booster seat to the automobile's existing car seat. In an open position, the upper surface of the booster seat is completely exposed to permit positioning of the child. The shield can then be pivoted, adjusted and locked with one hand to restrain the child. The automobile's safety belt is then extended across the shield to secure the booster seat to the automobile's existing car seat.

6 Claims, 3 Drawing Figures

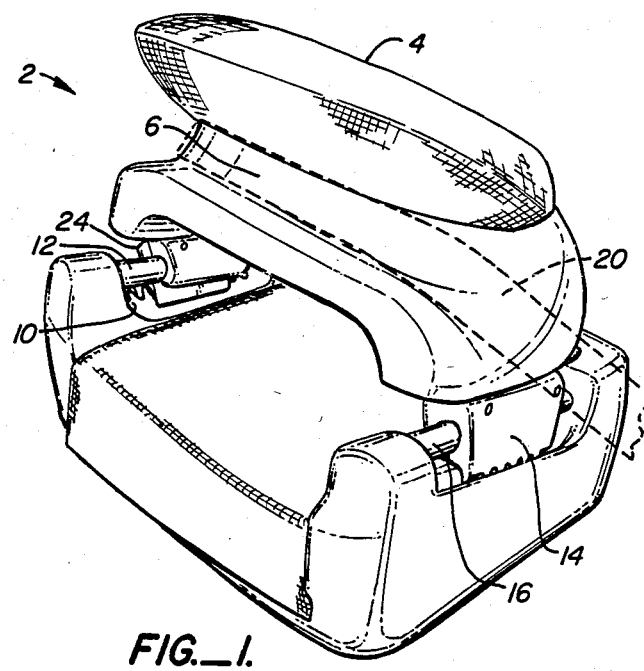
FIG._1.
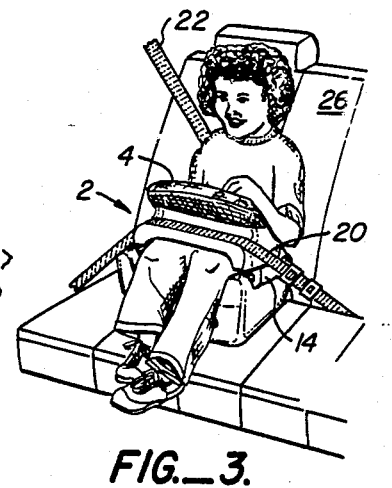
FIG._3.
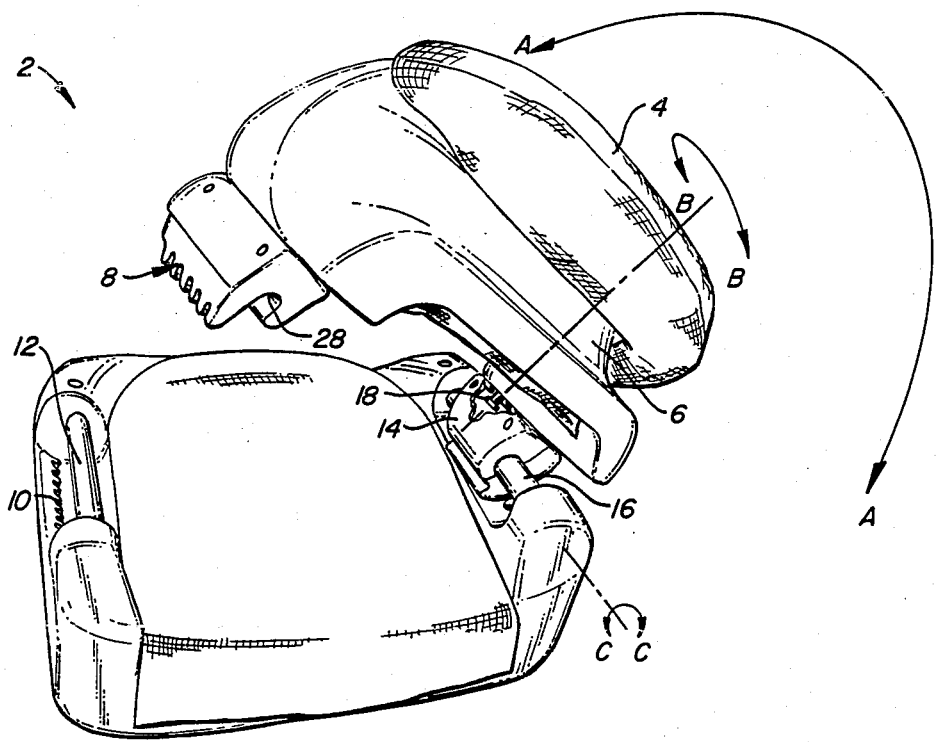
FIG._2.

CHILD'S CAR BOOSTER SEAT AND RESTRAINT SYSTEM

BACKGROUND OF THE INVENTION

Automobile car seats are designed and manufactured with adults in mind. This invention relates to a child's booster seat and restraint system which provides for the comfort and safety of a small child while riding in an automobile.

A child's contentment is enhanced during automobile trips if the child can sit in a position in which he or she can see out of the window. The car seat of the present invention raises the child occupant several inches above the existing car seat so that the child may view the scenery through the side windows and windshield of the car. At the same time, the restraining system of the car seat cooperates with the existing safety belt system of the car to restrain and safely secure the child within the car seat in the event of an accident.

For children in the toddler stages, conventional automobile car seats for infants are inadequate in size. As a result, parents often leave the children unrestrained once they become too large for conventional infant car seats. Simply boosting the child up higher in the car seat by such means as telephone books or pillows does not provide the proper restraint in case of a collision.

In order for a child's car booster seat and restraint system to be efficient, it must be easily installed in either the front or rear seats of automobiles, it must be adjustable to the various sizes of toddlers, and it must be easily and safely secured to the existing automobile safety belt restraint system.

SUMMARY OF THE INVENTION

The present invention provides a child's car booster seat and restraint system which is easily and securely incorporated into a car's existing adult safety restraint system. The car booster seat of this invention comprises a booster seat component which elevates the child from about four to six inches above the existing car seat. A shield member forms a frontal barrier to the booster seat to restrain the child's body within the boundaries of the restraint system of the car booster seat.

The shield is variably positionable in relation to the booster seat. To permit easy access to the booster seat area, the shield is pivotally interconnected to the structure of the booster seat. When in an open position, the entire upper surface of the booster seat is exposed from above and from the front for ease of placement of the child within the seat area. The pivotal connection between the shield and the booster seat permits the shield to be swung around from one side and in front of the child when seated properly so that the shield provides the frontal barrier to the torso of the child. The shield can be adjusted and secured about the child with one hand.

The booster seat is secured to the automobile's seat by means of a channel which traverses the front of the shield to accept the automobile's lap seat belt.

Thus, to seat the child easily and safely within the car booster seat and restraint system, the shield barrier is completely opened. The child is then placed on the booster seat. The shield barrier is then swung around and in front of the child and locked into one of the adjustable positions. The automobile's lap seat belt is then extended across the shield in the receiving channel, adjusted snugly and locked into the automobile's safety belt buckle. If there is a shoulder belt attached to the auto lap belt, a locking clip is provided to prevent extension of the belt and to hold it in a position behind the child. These and other features of the invention are more easily understood with reference to the following figures.

BRIEF DESCRIPTION OF THE FIGURES

FIG. 1 is a perspective illustration of the closed car seat.

FIG. 2 is a perspective illustration of the partially opened car seat.

FIG. 3 illustrates the occupied car seat properly secured in the automobile.

DETAILED DESCRIPTION

The two major elements of the car seat and restraining system of this invention are the booster seat 2 and the shield 4, as illustrated in FIGS. 1 and 2. The car seat is designed to be secured in place on the conventional automobile seat by an existing auto lap safety belt 20 which fits in the channel 6 traversing the shield 4 from side to side.

The shield 4 is adjustably engageable to the booster seat 2 along the sides of the seat. FIG. 1 illustrates the car booster seat in its closed position. The position of the auto lap safety belt 20 is indicated in phantom lines.

The booster seat 2 is formed of a rigid moldable material to elevate the child several inches above the existing car seat. The bottom of the booster seat is contoured to slope downwardly from the front to the back to assure the proper posture of the occupant. The sides and bottom of the booster seat 2 are of unitary construction, with the raised sides additionally defining the area within which the child is to be restrained. The existing automobile seat provides the back support to the occupant of the car booster seat.

The sides of the booster seat 2 include means for adjustably mounting the shield 4 to the booster seat 2 at a number of positions. One side mount 24 is disengageable while the other side mount 14 contains a fixed swivel coupling 18. The shield 4 locks into any one of several positions varying the distance between the shield 4 and the back of the car seat 26. These variable locking positions are defined by the tongue-and-groove engagement between the notched coupling member 8 in the shield 4 and the notched track 10 provided in the sides of the booster seat 2. While in the closed position shown in FIG. 1, this tongue-and-groove engagement securely locks the shield 4 in one of the positions on the booster seat 2.

Both side mounts are provided with guide tubes fixed in the sides of the booster seat 2. The guide tube 16 on the side which is provided with the fixed swivel coupling 14 defines the movement of the swivel coupling 14 from the front to the back of the booster seat 2. The guide tube 12 on the side with the disengageable mount 24 proivdes a snap fit with the notched coupling member 8 of the shield for greater strength and security of the closure.

The shield 4 is of unitary construction with all surfaces presented to the occupant of the car seat padded with a resilient, deformable material.

The contoured portions of the booster seat 2 may also be padded for comfort.

FIG. 2 depicts the shield 4 in a partially open position. In this figure, the notched surface of the shield's notched coupling member 8 is more clearly illustrated. The notches of the coupling member 8 engage in any of the several positions in tongue-and-groove alignment with the seat's notched track 10. The coupling member 8 is also provided with a groove 28 adapted to snap fit with the guide tube 12.

Notches in symmetrical positions are provided at the fixed swivel coupling 14 at the opposite side of the car seat. The swivel coupling 14 is dimensioned to permit the notches to disengage when the coupling is rotated along the axis of the guide tube 16, shown by arrow C. The shield assembly 4 also rotates about the axis of the guide tube as indicated by arrow AA. The swivel bearing 18 permits the shield 4 to rotate about the axis of the swivel bearing 18, as shown by arrow BB.

The axis of rotation along the guide tube 16 is perpendicular at all times to the axis of rotation of the swivel bearing 18. Thus, by disengaging the snap fit of the coupling member 8 with guide tube 12 and notched track 10, the swivel bearing 18 and guide tube 16 can be used to swing the shield 4 around and in front of the booster seat 2 until the seating area of the booster seat 2 is completely unobstructed. In fact, the shield 4 can be opened to rest at the side of the car seat nearest the side with the fixed side mount 14.

To operate the car seat of the present invention, the adult places the car seat on the existing seat of the automobile as illustrated in FIG. 3. The shield is opened to expose the seating area of the booster seat 2. The child is then placed within the car seat. The shield 4 is rotated about the side mount 14 around and in front of the child. The shield is adjusted to the size of the child by moving the shield 4 along the guide tube 16. When a snug position is located, the disengageable side mount is locked into place about the guide tube 12 and into groove-and-tongue engagement with the notched track 10. The operation of adjusting the shield and locking it in position can be accomplished with one hand.

The lap seat belt 20 of the automobile is then extended across the shield 4 along the channel 6. If a shoulder strap 22 is present, it is locked to prevent extension with a locking clip and placed behind the child's back.

It should be noted that if the car seat is left in the automobile unoccupied, it should still be secured in place with the auto's lap seat belt. In the event of an accident, the car seat could become a dangerous projectile if left unsecured.

While the above provides a full and complete disclosure of the preferred embodiments of the invention, various modifications, alternate constructions, and equivalents may be employed without departing from the true spirit and scope of the invention. Therefore, the above description and illustrations should not be construed as limiting the scope of the invention which is defined by the appended claims.

What is claimed is:

1. A child's car seat and restraint system, for use on an automobile's existing car seat having an existing seat back, an existing seat bottom, and an existing safety belt, comprising:
   a booster seat having a seat portion for elevating the child above the horizontal level of the existing seat bottom;
   a shield, extending transversely and above said booster seat to provide a frontal restraint for the child, said frontal restraint being variably positionable into a plurality of discrete locking positions extending away from the existing seat back;
   joint means for pivotal interconnection between said shield and a first side of said booster seat, said joint means rotating said shield simultaneously about two mutually perpendicular axes;
   guide means for a slidable interconnection between said shield and said first side of said booster seat;
   lock means for removable interconnection between said shield and a second side of said booster seat corresponding to said discrete plurality of locking positions of said shield; and
   means in said shield for accepting within a contour in said shield the existing safety belt and securing the car booster seat against the existing car seat.

2. The invention of claim 1, wherein the booster seat comprises a padded chair bottom shaped with a seat surface which is lower in the back than in the front and with raised side portions.

3. The invention of claim 1, wherein said plurality of discrete locking positions are defined by a notched coupling member in said shield having tongue-and-groove engagement with a notched track in the raised sides of the booster seat extending from the front of the booster seat towards the back of the booster seat for engaging said notched coupling member in said shield.

4. The invention of claim 3, wherein said joint means for pivotal interconnection comprises a horizontal axle extending from the front of the booster seat towards the back of the booster seat, about which said notched coupling member in said shield rotates about a vertical plane facing the child, and a swivel joint between said notched coupling member and said shield about which said shield simultaneously rotates about an axis of rotation which is perpendicular to said horizontal axle, and further wherein said guide means comprises said horizontal axle and a concave portion of said notched coupling member shaped to slidably receive said horizontal axle, whereby said shield is slidably and pivotably interconnected to said first side of said booster seat.

5. A child's car seat and restraint system, for use on an automobile's existing car seat having an existing seat back, an existing seat bottom, and an existing safety belt, comprising:
   a booster seat, said booster seat having a seat portion with upwardly flared sides for elevating the child above the horizontal level of the existing seat bottom;
   a shield, extending transversely and above said booster seat to provide a frontal barrier for the child, said shield locking into a series of discrete locking positions away from the existing seat back along said booster seat to accommodate children of different girths;
   joint means for a pivotal interconnection between said shield and a first side of said booster seat, said joint means rotating said shield simultaneously about two mutually perpendicular axes;
   lock means for removable interconnection between said shield and a second side of said booster seat at said locking positions; and
   a contoured channel traversing said shield for accepting the existing safety belt and a securing said child's car seat to the existing automobile car seat with the existing safety belt, wherein each side of the booster seat is provided with a notched track which fits in tongue-and-groove alignment with a series of notches in said shield for locking said shield in said discrete locking positions away from the existing seat back.

6. A child's car seat and restraint system, for use on an automobile's existing car seat having an existing seat back, an existing seat bottom, and an existing safety belt, comprising:
- a booster seat, said booster seat having a seat portion with upwardly flared sides for elevating the child above the horizontal level of the existing seat bottom;
- a shield, extending transversely and above said booster seat to provide a frontal barrier for the child, said shield locking into one of a series of discrete locking positions away from the existing seat back along said booster seat to accommodate children of different girths;
- joint means for a pivotal interconnection between said shield and a first side of said booster seat, said joint means rotating said shield simultaneously about two mutually perpendicular axes;
- lock means for removable interconnection between said shield and a second side of said booster seat at said locking positions;
- a contoured channel traversing said shield for accepting the existing safety belt and securing said child's car seat to the existing automobile car seat with the existing safety belt;
- wherein said joint means comprises a first guide tube extending from the front of the booster seat to the back of the booster seat, about which a first coupling member along the first side of said shield is slidably engaged; and a swivel coupling between said coupling member and said shield;
- wherein said lock means comprises a second guide tube about which a second coupling member along a second side of said shield is slidably engaged; and
- wherein said first and second coupling members are provided with a series of notches for tongue-and-groove engagement with a first and second notched track provided along said first and second sides of said booster seat.

* * * * *